June 2, 1970　　　　L. J. LAZARIDIS　　　　3,515,380
RADIANT-TUBE FURNACE

Filed Aug. 1, 1968　　　　　　　　　　　　　　2 Sheets-Sheet 1

INVENTOR.
LAZAROS J. LAZARIDIS
BY

ATTORNEYS

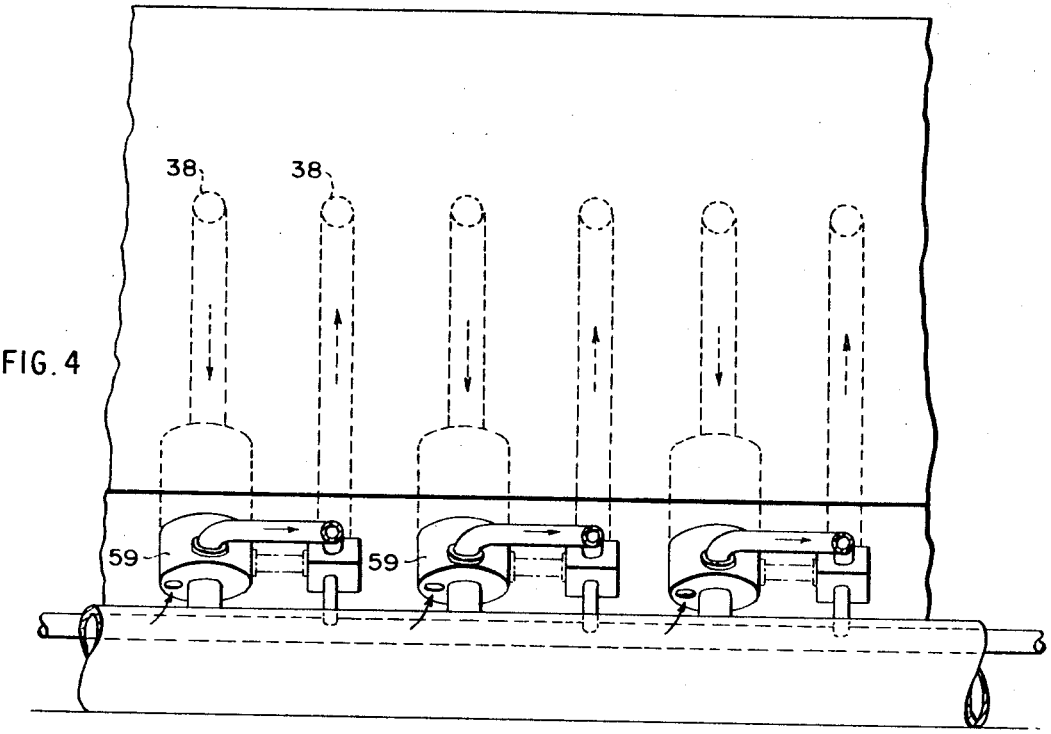
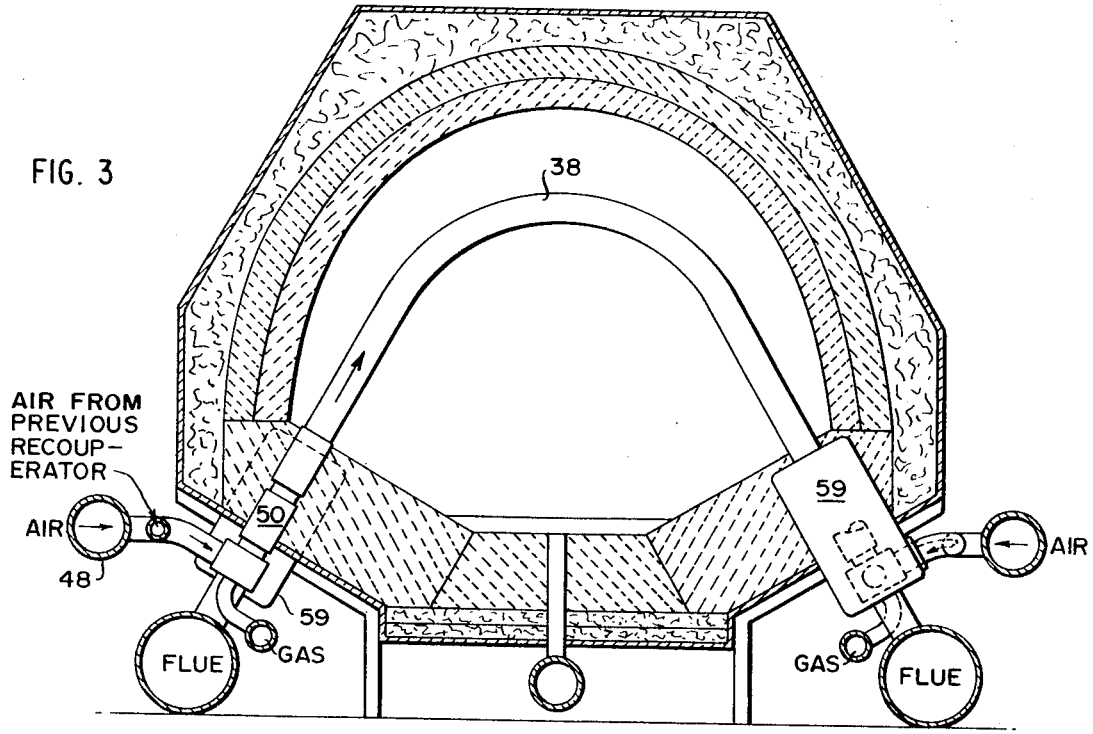

United States Patent Office 3,515,380
Patented June 2, 1970

3,515,380
RADIANT-TUBE FURNACE
Lazaros J. Lazaridis, Lincoln, Mass., assignor to Thermo Electron Corporation, Waltham, Mass., a corporation of Delaware
Filed Aug. 1, 1968, Ser. No. 749,379
Int. Cl. F27b 5/14
U.S. Cl. 263—42                                            7 Claims

ABSTRACT OF THE DISCLOSURE

A radiant-tube industrial furnace for heat-processing work or materials at high temperatures. Work-pieces, for example, steel billets to be forged, may be conveyed through the furnace in which aligned pairs of radiant tubes or aligned radiant tube arches are arranged in longitudinal sequence. The tubes are preferably made of silicon carbide and heated to radiance by burners of a fuel-mix such as gas and air. The workpieces move along the length of the hearth of the furnace which is disposed preferably so as to occupy the widest point of separation in the case of pairs of radiant tubes or the base of the arched radiant tubes. Heat transfer from the tubes to the work is maximized by optimization of the radiation view factor through tube angle or arch shape selection and proper location of hearth. The radiant tubes contain and isolate the flue gases from the work being processed permitting the use, where desired, of a protective atmosphere about the work. The pairs of tubes may be connected to a recuperator to preheat all or part of the incoming combustion air for the fuel-mix for the burners. Similarly, the radiant tube arches may be connected in series with recuperation preheating for each arch from the output of the preceding arch.

---

Figure 1:
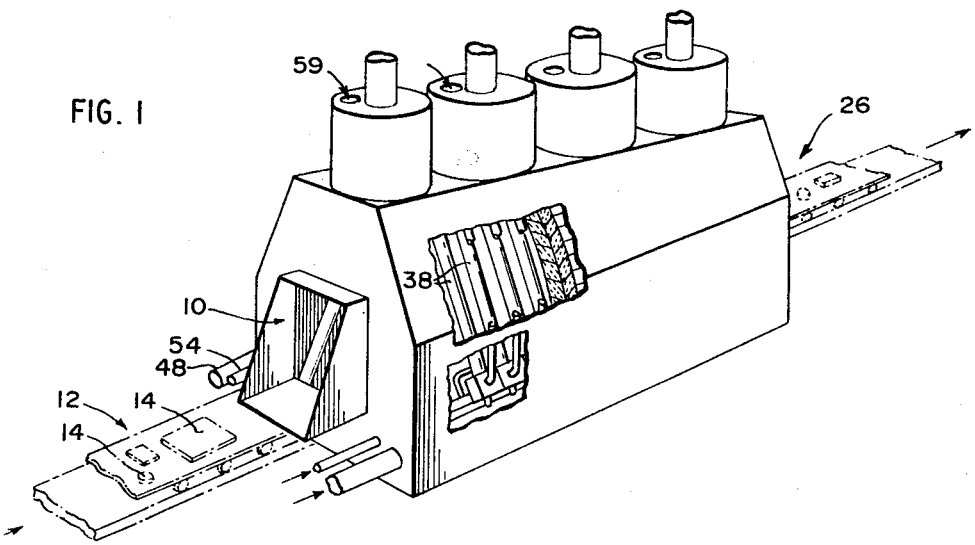

The invention relates to a highly efficient combustion-heated industrial furnace for use in a multitude of high temperature applications including the forging of steel, heat treating of various metals, brazing or other heat-processing operations, especially where isolation of the work from the products of combustion is desirable. Radiant-tube furnaces are not basically novel, but various considerations have limited their use to operations not much higher than 2000° F. Some of these considerations include economy of operation, efficient heat transfer, use of low temperature materials, practical recuperation and a preoccupation with induction heating which has, to some extent, been favored, particularly in operations at the higher (over 2000° F.) temperatures. The present invention, however, may be embodied in a furnace which compares favorably in original cost, operating cost and life expectancy with electrical resistance or induction furnaces of equivalent capacity and versatility.

In accordance with one form of the invention, pairs of silicon carbide tubes are arrayed in an inverted V or alpha configuration and the V's are aligned to form two sides of a triangular tunnel chamber. The floor of the tunnel, which is the third side of the triangle is the hearth of the furnace. It is heavily insulated and carries the "work" to be heat processed. If desired, there may be provided skids or other material handling means along the hearth to carry the work through the furnace. The various pairs of radiant tubes may be operated in groups or individually at different temperatures to provide any preferred schedule of heat-processing. One or more pairs of radiant tubes can be temperature controlled so as to form zones of temperature within the furnace and so as to achieve for the specific material being processed the desired time-temperature relationship. Control of the temperature of the various zones may be had with conventional temperature measuring and monitoring devices such as thermopiles, "Radiamatic" tubes or the like. Further control of the temperatures of the individual pairs or zones may be achieved by passing the flue gases of the radiant tubes to a recuperator in which combustion air may be pre-heated, directed to the indiivdual radiant tube burners, and diluted with air at ambient temperature to the extent necessary to provide suitable tube temperatures.

In another form of the invention, much the same features and advantages are provided. Each pair of tubes is supplanted by a single arched radiant tube at the entry to which a burner is provided to generate the heat to raise the tube to radiance. At the outlet of each tube is a recuperator which extracts heat from flue gases to pre-heat incoming air. As in the other embodiment, the pre-heated air may be diluted with ambient air for temperature or combustion control as desired.

Figure 2:
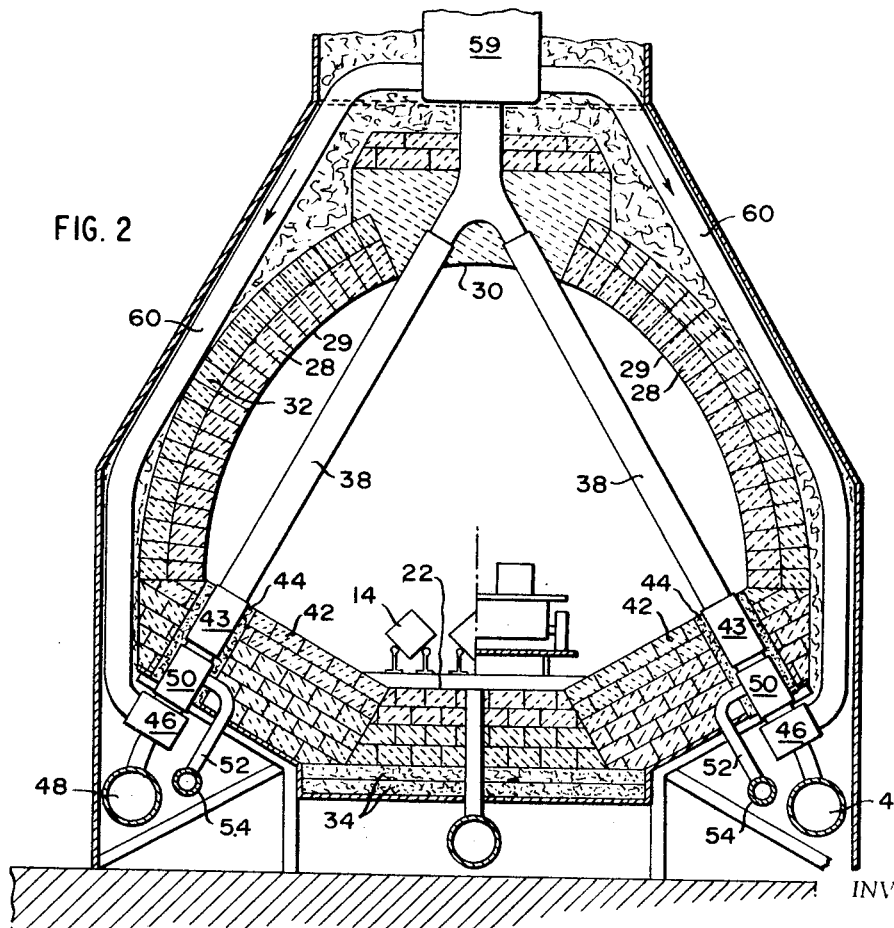

Apart from the structural convenience of locating the radiant tubes in an array of inverted V's or arches rather than having the burners at the bottom of the chamber as has been done, the radiation view factor is vastly enhanced. In layman's language, efficiency of heat transfer from the radiant tubes to the work is maximized and operations are more consistently and less expensively conducted. For a better understanding of the present invention together with other and further objects, features, and advantages, the following specification of a preferred embodiment of the invention should be read with reference to the attached drawing in which:

FIG. 1 is a perspective view, partly broken away of an industrial radiant tube furnace, and FIG. 2 is a sectional view of the furnace of FIG. 1, and FIG. 3 is a view in cross-section of the invention as embodied in an arched tube furnace; and FIG. 4 is a fragmentary side view of the embodiment of FIG. 3.

In FIG. 1, a continuous-feed industrial furnace including aligned pairs of radiant tubes in an alpha configuration is shown. At one end of the furnace is an entrance 10 which may accommodate continuously moving conveyor 12 on which work articles 14 to be heat-treated are placed. Similarly, with a pusher-type mechanism billets of stock can be moved through the length of the furnace on commercially available skids, usually water-cooled, running the length of the furnace and so arranged as to position the stock to be heated at a point where the best radiation view factor exists and heat transfer is maximized.

As further illustrated in FIG. 2, the furnace has an interior lining composed of insulating high-temperature fire brick 28 forming a hearth or bottom 22 and sides 29. The sides 29 extend outwardly from the bottom 22, and then curve inwardly to meet at a flue header 30. The flue header of each pair of tubes thus functions as the keystone of an arch. The high temperature insulating fire brick 28 which forms the interior walls 29 and bottom 22 is enclosed by a further wall of fire brick and insulation 32.

The entire furnace is sheathed in sheet-metal and the complete assembly of fire brick, insulation and sheath forms a tight enclosure. Within that enclosure a protective atmosphere preventing the contact of the work being processed with atmospheric air may be maintained and may be continuously supplied at a slight positive pressure to ensure that continuous outflow rather than inflow occurs. This protective atmosphere may be supplied by special ducting (not shown) at suitable locations along the furnace.

Within the furnace are two rows of aligned hollow silicon carbide radiant tubes, the tubes 38 being typical. Each row of these tubes is inclined at an angle so as to form an elongated inverted V over the hearth 22 upon which the material to be heat-treated is conveyed. Each upwardly converging pair of tubes 38 of the rows is supported at its upper end in suitable openings 40 formed in the header 30. The divergent lower ends of each pair of tubes 38 are supported in openings formed through an extension 42 of the bottom wall. Adapters 43 surround the tube ends and are sealed with suitable insulating packing into the extensions 42 of the bottom wall. A burner 50 is provided for each tube and connected to each burner is an air inlet chamber 46, ambient air inlet lines preferably being connected between the chamber 46 and air manifold 48. A gas line 52 is also connected to each burner 50, and each gas line 52 is preferably in communication with a gas delivery manifold 54. The inverted V configuration of the radiant tubes 38 provides for maximum radiant heat transfer between the tubes 38 and the workpiece 14 which is "contained" between and below the tubes 38. This increased efficiency is particularly notable in comparison with other radiant tube furnaces where the workpiece is usually disposed between a pair or pairs of parallel radiant tubes. The increased efficiency of the inverted V or alpha configuration is primarily due to what is known as the radiation view factor. It can be shown that efficiency of heat transfer in a furnace such as that of the invention is maximized when the angle subtended by the tubes of each pair lies between approximately 28° and 70°. For a practical furnace, pairs of tubes in which the total angle between tubes of each pair is about 60° are suitable for highly efficient radiant heat transfer and reasonable flexibility in processing of work of various sizes and shapes.

The use of a recuperator with this furnace is optional depending on desired operating characteristics. Where such a recuperator is used it may take the form illustrated in the drawing and described below.

Flue gases leaving the radiant tubes 38, pass from the keystone-header and are fed into recuperators. The recuperator 59 is typical and may be generally similar in structure to those of U.S. Pat. No. 3,416,011, issued Dec. 10, 1968, Heat Exchangers, assigned to the assignee of the present application. In the same manner as is best illustrated in FIG. 4 of the cited application, incoming air is jetted against one surface of a heat transfer wall or walls while flue gases are jetted against the opposite surface of the heat transfer wall or walls. Tubes 60, preferably passing through the insulated space under the sheath 36 may be utilized to transfer the incoming air between the recuperator 59 and the chamber 46. If desired, the incoming air may be passed within the sheath from below the furnace to the recuperator and may be returned to the burner in similar fashion. An adjustment of burner temperature is made possible by mixing unheated incoming air with that from the recuperator in the chamber 46 in the proportions needed to achieve desired combustion.

In FIGS. 3 and 4 the furnace shown is similar in principle to that of FIGS. 1 and 2. In this instance, however, each pair of radiant tubes is replaced by a single arched radiant tube 38. The hearth and walls of the furnace are generally the same, except that there is no need for a common outlet or flue at the top of the furnace nor is it necessary to conduct preheated combustion air through the furnace within the sheath.

In a typical burner 50, as seen in FIG. 3, unheated incoming air may be supplied from a manifold and mixed, as desired, in a line leading to the burner 50 from a recuperator. Gas to make up the fuel mix is introduced to the burner from a gas feed manifold 54. Combustion of the fuel mix takes place in the burner to heat the arched radiant tube to radiance and the flue gases are passed through a recuperator 59 disposed adjacent the bottom and side of the furnace. Incoming air is passed through the recuperator to be reheated preferably in the jet-impingement manner taught in the previously cited application Ser. No. 446,476 Heat Exchangers and this air is then fed to the next burner in the sequence. A flue manifold 81 passes down the length of each side of the furnace and receives the output of each radiant tube after recuperation takes place.

Thus, it may be seen that a series arrangement of burners and recuperators is provided with all of the features and advantages of the embodiment previously described. Again, the work being processed enjoys the same optimum radiation view factor to maximize heat transfer from radiant tubes to work. Also, the same controls are available to provide the desired degree of combustion and output heat at each arched tube or group of arched tubes as needed. The arched tubes include diverging straight sections which are desirably at the same angle to each other as the aligned pairs of straight tubes in the alternative embodiment of the invention.

Although what has been described constitutes preferred embodiments of the invention, the invention should not be limited to the details shown but only as required by the spirit and scope of the appended claims.

What is claimed is:

1. In an industrial furnace having a generally horizontally disposed hearth for supporting work to be heat-processed and radiant tubes for providing heat, the combination in which portions of at least one radiant tube extend downwardly in approximately the same vertical plane to points adjacent opposite sides of said hearth, said portions of radiant tubes diverging at an angle lying between approximately 28 to 70 degrees, each of said portions comprising an independent radiant tube.

2. In an industrial furnace as defined in claim 1, the combination of a burner connected to the lower end of each of said radiant tubes adjacent said hearth, means for providing a fuel-mix for combustion in said burner, a flue connected to the upper ends of each of said radiant tubes to receive output products of combustion therefrom and a recuperator connected to said flue to extract heat from said output products of combustion passing therethrough.

3. In an industrial furnace as defined in claim 2 the combination which includes a first plurality of aligned pairs of independent radiant tubes, each tube of which diverges from the other tube of the pair, a burner being connected to each of said radiant tubes, said planes being displaced from each other along said hearth, a second plurality of recuperators, each of which is connected to said flue to extract heat from products of combustion flowing therethrough, a source of incoming air for said burners, means for heating quantities of said incoming air in said recuperators and means for supplying incoming air from said source and heated incoming air from said recuperators to said burners.

4. In an industrial furnace as defined in claim 1, the combination which further comprises a flue for containing and removing products of combustion from said radiant tubes, said flue communicating directly with said radiant tubes and means for providing a predetermined atmosphere within said furnace and about said work, said products of combustion and said atmosphere being physically separated from one another by said radiant tubes.

5. In an industrial furnace as defined in claim 4, the combination which further comprises a recuperator disposed in heat-exchanging relationship with said flue and a source of incoming air connected to said recuperator, said recuperator including at least a heat-exchanging wall against one side of which said products of combustion impinge as jets and against the other side of which said incoming air impinges as jets.

6. In an industrial furnace having a generally horizontally disposed hearth for supporting work to be heat-processed and radiant tubes for providing heat, the combination in which at least one radiant tube is in the form of an arch disposed in a generally vertical plane, the ends of said arch extending downwardly to points adjacent opposite sides of said hearth, said ends of said arched radiant tube diverging at an angle lying between approximately 28 to 70 degrees and which includes a burner fixed to one end of said one radiant tube, means for providing a fuel-mix to said burner for combustion therein to heat said one arched radiant tube to radiance, a flue connected to the opposite end of said one arched radiant tube to receive output products of combustion and a recuperator connected to said flue for extracting heat from said output products of combustion.

7. In an industrial furnace as defined in claim 6, the combination which comprises a plurality of additional arched radiant tubes disposed in alignment with said first arched radiant tube in said furnace and along said hearth, each of said additional arched radiant tubes being provided with a burner at one end thereof and a flue and recuperator at the other end thereof in the same manner as said first arched radiant tube, a source of incoming air for said burners, means for preheating quantities of said incoming air in said recuperators, and means for supplying said pre-heated air and said incoming air together to said burners.

References Cited
UNITED STATES PATENTS 2,513,597  7/1950  Taylor.

JOHN J. CAMBY, Primary Examiner

U.S. Cl. X.R.

126—91; 263—6